(12) United States Patent
Cansfield et al.

(10) Patent No.: US 10,569,688 B2
(45) Date of Patent: Feb. 25, 2020

(54) SEATING MODULE HAVING A RECESSED GRIP AND A SEATING ARRANGEMENT INCLUDING A SEATING MODULE HAVING A RECESSED GRIP

(71) Applicant: Adient US LLC, Plymouth, MI (US)

(72) Inventors: Jonathan Peter Cansfield, Dexter, MI (US); Jack Marple, Seattle, WA (US); Chevy Ho, Seattle, WA (US); Joel Richman, Everett, WA (US); Tony Bravetti, Brier, WA (US)

(73) Assignee: ADIENT AEROSPACE LLC, Kirkland, WA (US)

(*) Notice: Subject to any disclaimer, the term of this patent is extended or adjusted under 35 U.S.C. 154(b) by 0 days.

(21) Appl. No.: 15/850,678

(22) Filed: Dec. 21, 2017

(65) Prior Publication Data

US 2019/0193616 A1 Jun. 27, 2019

(51) Int. Cl.
*B60N 3/02* (2006.01)
*B64D 11/06* (2006.01)

(52) U.S. Cl.
CPC ............ *B60N 3/02* (2013.01); *B64D 11/0602* (2014.12)

(58) Field of Classification Search
CPC ........ B64D 11/06; B64D 11/0602; B60N 3/02
See application file for complete search history.

(56) References Cited

U.S. PATENT DOCUMENTS

| | | | | |
|---|---|---|---|---|
| 2,450,093 A | * | 9/1948 | Richardson | B60N 2/242 297/183.7 |
| 2,564,924 A | * | 8/1951 | Patton | B60N 3/02 297/183.7 |
| 3,482,875 A | * | 12/1969 | Barecki | A47C 5/00 297/440.2 |
| 3,642,322 A | * | 2/1972 | Bilancia | A47C 31/00 297/183.7 |
| 3,695,689 A | * | 10/1972 | Barecki | B60N 2/242 297/188.07 |
| 3,737,198 A | * | 6/1973 | Barecki | B61D 33/00 297/450.1 |
| 3,747,979 A | * | 7/1973 | Barecki | B60N 2/012 244/122 R |
| 3,802,738 A | * | 4/1974 | Tantlinger | B61D 33/0057 297/183.7 |
| 3,899,211 A | * | 8/1975 | Barecki | B60N 2/012 296/63 |
| RE29,271 E | * | 6/1977 | Barecki | A47C 5/04 296/63 |
| 4,088,367 A | * | 5/1978 | Atkinson | A47C 5/12 297/183.8 |
| D256,298 S | * | 8/1980 | Barecki | D6/356 |
| 4,776,635 A | * | 10/1988 | Halliez | B60N 2/242 297/440.15 |
| 6,799,798 B1 | * | 10/2004 | Mandart | B60N 3/02 297/183.6 |

(Continued)

FOREIGN PATENT DOCUMENTS

WO 2011/077363 A2 6/2011

*Primary Examiner* — Timothy J Brindley
(74) *Attorney, Agent, or Firm* — McGlew and Tuttle, P.C.

(57) ABSTRACT

A seating module having a recessed grip for a vehicle, in particular an aircraft, and a seating arrangement that includes a seating module that has a recessed grip. The seating module includes a shell structure that defines the recessed grip in an upper area of the shell structure.

20 Claims, 6 Drawing Sheets

(56) References Cited

U.S. PATENT DOCUMENTS

| | | | | |
|---|---|---|---|---|
| D522,776 S * | 6/2006 | Williams | ............ | D6/716.4 |
| 7,111,808 B2 * | 9/2006 | Sprenger | ............ | A62B 3/00 |
| | | | | 244/118.5 |
| 7,523,993 B1 * | 4/2009 | Daneault | ............ | B60N 2/242 |
| | | | | 244/118.5 |
| 8,096,621 B2 * | 1/2012 | Braun | ............ | B60N 2/686 |
| | | | | 297/183.6 |
| 8,882,035 B2 * | 11/2014 | France | ............ | B64D 11/0023 |
| | | | | 244/118.6 |
| 9,533,765 B2 * | 1/2017 | Vergnaud | ............ | B64D 11/06 |
| 10,246,192 B1 * | 4/2019 | Prasad | ............ | B60N 2/995 |
| 10,301,026 B2 * | 5/2019 | Tighe | ............ | B64D 11/06 |
| 2006/0061190 A1 * | 3/2006 | Fukuda | ............ | B60N 2/686 |
| | | | | 297/440.1 |
| 2007/0246981 A1 * | 10/2007 | Plant | ............ | B64D 11/06 |
| | | | | 297/248 |
| 2008/0018149 A1 * | 1/2008 | Blackmon | ............ | B60N 2/2812 |
| | | | | 297/216.11 |
| 2010/0019551 A1 * | 1/2010 | Oviedo | ............ | A47C 5/12 |
| | | | | 297/183.6 |
| 2010/0155536 A1 * | 6/2010 | Asami | ............ | A47C 7/40 |
| | | | | 244/122 R |
| 2013/0320139 A1 * | 12/2013 | Cho | ............ | B64D 11/06 |
| | | | | 244/118.6 |
| 2013/0320736 A1 * | 12/2013 | Teufel | ............ | B60N 2/366 |
| | | | | 297/383 |
| 2013/0343072 A1 * | 12/2013 | Ehrmann | ............ | F21V 33/00 |
| | | | | 362/471 |
| 2014/0035263 A1 * | 2/2014 | Bancroft | ............ | B60N 2/01583 |
| | | | | 280/657 |
| 2014/0145477 A1 * | 5/2014 | Ersan | ............ | B64D 11/06 |
| | | | | 297/145 |
| 2015/0224903 A1 * | 8/2015 | McDowell | ............ | B60N 3/023 |
| | | | | 297/183.6 |
| 2016/0200233 A1 * | 7/2016 | Guzman | ............ | B60N 3/026 |
| | | | | 296/1.02 |
| 2017/0057384 A1 * | 3/2017 | Pleiman | ............ | B60N 2/2866 |
| 2018/0009531 A1 * | 1/2018 | Gill | ............ | B64D 11/06 |

* cited by examiner

SEATING MODULE HAVING A RECESSED GRIP AND A SEATING ARRANGEMENT INCLUDING A SEATING MODULE HAVING A RECESSED GRIP

FIELD OF THE INVENTION

The present invention relates to a seating module that has a recessed grip for a vehicle, in particular an aircraft, and a seating arrangement that includes a seating module that has a recessed grip.

BACKGROUND OF THE INVENTION

Access into and out of a seat for a vehicle, in particular an aircraft, can be difficult due to the lack of space between seats. This is particularly a problem after long trips, such as long flights, when a passenger has sat for several hours and cannot readily get up from a seat after sitting for extended periods of time. Conventional seating modules do not provide a structure that allows a passenger of the vehicle to grasp and hold on to so that the passenger can pull himself or herself up from a seat or can hold on to as the passenger bends down to sit in the seat.

SUMMARY OF THE INVENTION

An object of the present invention is to provide a structure for a vehicle, in particular an aircraft, that a passenger can hold on to when the passenger sits down in a seat or gets up from the seat. This object is achieved by providing a seating module with a recess that defines a grip that can be grasped by a user that is located behind the seating module so that the user can hold on to the recessed grip as the passenger gets up from a seat located behind the seating module or as the passenger sits down in the seat located behind the seating module. The recessed grip allows the passenger to more easily access and egress from the seat located behind the seating module. The recessed grip is particularly useful for when the seat is converted to a bed on an aircraft and the passenger is getting into the bed or getting up from the bed.

According to the present invention, a seating module comprises a seating module structure. The seating module comprises at least one recess. The at least one recess defines a grip (grip structure) for a passenger located behind the seating module with respect to a direction of travel of a vehicle.

The seating module structure may comprise a shell structure. The shell structure may comprise the at least one recess.

The shell structure may comprise a shell structure upper surface. The shell structure upper surface may define the at least one recess. In another embodiment, the at least one recess may be defined by a rear surface of the shell and a grip structure may be connected to the rear surface of the shell to define a handle for the passenger located in a seat behind the shell.

The shell structure may define a first seating area and a second seating area.

The at least one recess may be located between the first seating area and the second seating area.

The shell structure may comprise another recess.

The shell structure may define a single seating area. The at least one recess may be located on one side of the single seating area and the another recess may be located on another side of the single seating area with respect to a lateral direction. The lateral direction may be perpendicular to the traveling direction of the vehicle.

The at least one recess may be aligned with said another recess in the lateral direction.

The at least one recess may face in a direction of a ceiling of the vehicle. The vehicle may be an aircraft.

According to the present invention a seating arrangement is provided for a vehicle. The seating arrangement comprises a seating module a seating module structure that includes at least one recess as previously describe above.

The seating arrangement may further comprise another seating module to provide a plurality of seating modules. Each seating module may be located at a spaced location from each other with respect to the direction of travel of the vehicle. Each of the seating modules may comprise a shell structure that defines the at least one recess or one of the seating modules may comprise a first shell structure that defines the at least one recess and another one of the seating modules may comprises a second shell structure that defines two recesses offset from the at least one recess in a lateral direction, which is perpendicular to the direction of travel of the vehicle.

The recess associated with a respective seating module may be arranged in front of a rearward seat that is associated with a rearward seating module and may be aligned with the rearward seat. The recess associated with a respective seating module may be offset in a longitudinal direction of the seating modules. Each of the recesses may be offset in a longitudinal direction of the seating modules The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
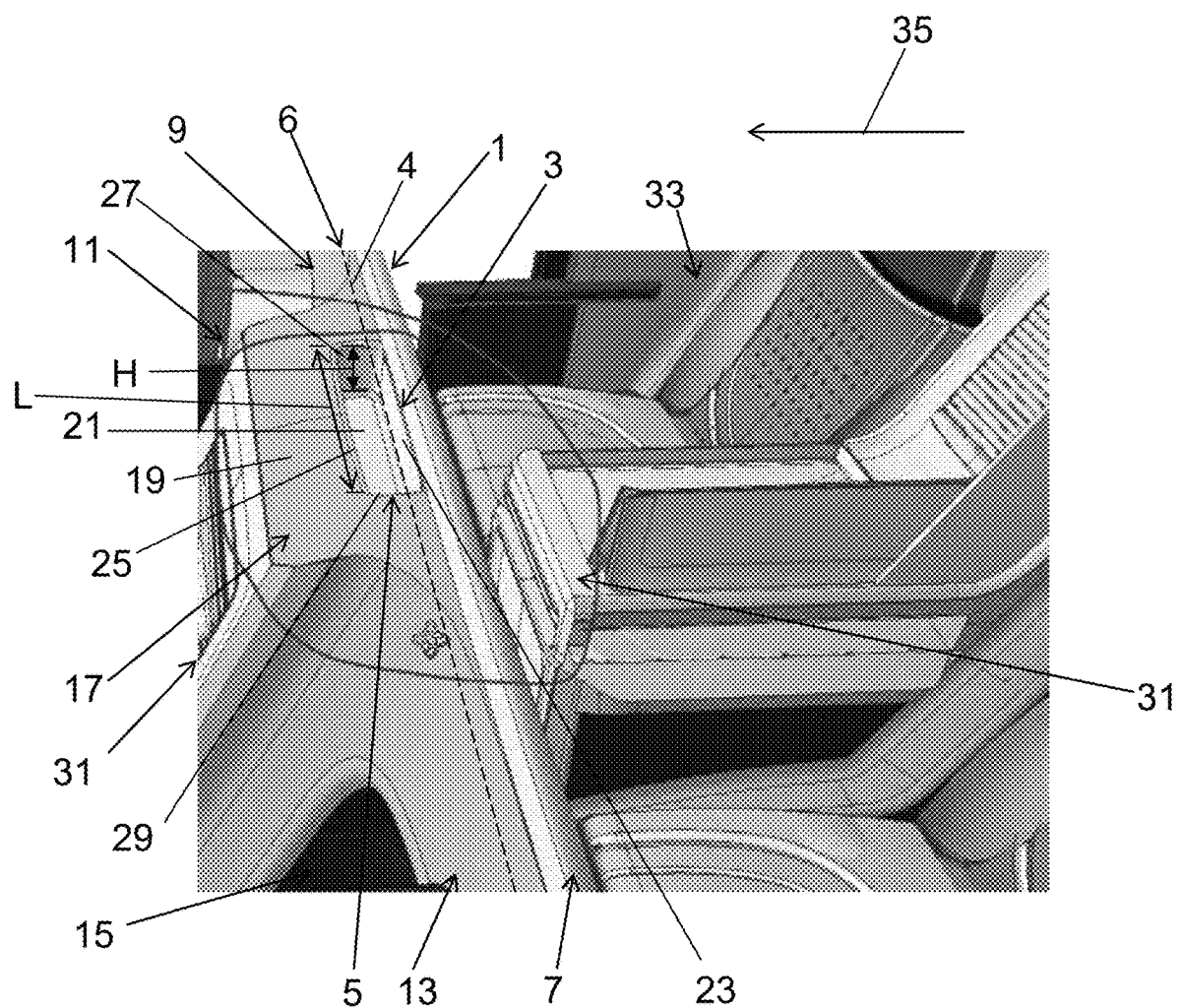
FIG. 1 is an enlarged perspective of two seating modules.

Referring to the drawings in particular, FIG. 1 is an enlarged perspective view of a seating module 1. The seating module 1 has at least one recess 3. The at least one recess 3 is provided in an upper area 5 of the seating module 1. The at least one recess 3 faces in a direction of a ceiling 4 of a vehicle 6. The seating module 1 has a seat shell 7. The seat shell 7 defines a first seating area 9 in which a first seat 11 is provided. The seat shell 7 defines a second seating area 13 in which a second seat 15 is provided. Each of the first seat 11 and the second seat 15 is a convertible seat, which can be moved into a flat, horizontal position to form a bed. Further, each of the first seat 11 and the second seat 15 can move to adjust a recline position of a respective seat. The recess 3 is provided in the seat shell 7 between the first seating area 9 and the second seating area 13. The seat shell 7 has an upper seat shell surface 17. The upper seat shell surface 17 has a first upper seat shell surface portion 19, a second upper seat shell surface portion 21, a third upper seat shell surface portion 23, a fourth upper seat shell surface portion 25, a fifth upper seat shell surface portion 27 and a sixth upper seat shell surface portion 29. The recess 3 is defined by the second upper seat shell surface portion 21, the third upper seat shell surface portion 23, the fourth upper seat shell surface portion 25, the fifth upper seat shell surface portion 27 and the sixth upper seat shell surface portion 29. The second upper seat shell surface portion 21 is located at a distance H from the first upper seat shell surface portion 19. The distance H defines a depth of the recess 3. The second upper seat shell surface portion 21 defines a bottom portion of the recess such that the recess 3 does not extend fully through the seat shell 7 and the seating module 1. The first upper seat shell surface portion 19 extends parallel to the second upper seat shell surface portion 21. The third upper seat shell surface portion 23, the fourth upper seat shell surface portion 25, the fifth upper seat shell surface portion 27 and the sixth upper seat shell surface portion 29 are perpendicular to the first upper seat shell surface portion 19 and the second upper seat shell surface portion 21. A console 31 is provided between the first seat 11 and the second seat 15

Figure 2:
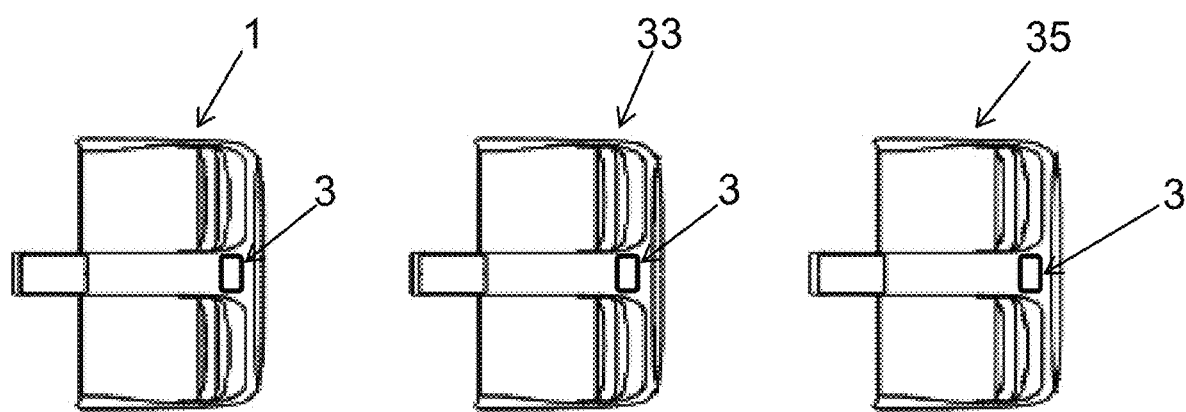
FIG. 2 is a top plan view of an arrangement of seating modules.

As shown in FIG. 1 and FIG. 2, the seating module 1 is located in front of a second seating module 33. The second seating module 33 is identical to the seating module 1 and has the same features of the seating module 1. The second seating module 33 is located behind the seating module 1 with respect to a travel direction 35 of a vehicle. The recess 3 of the seating module 1 defines a grip (recessed grip/grip structure) for passengers seated in seats associated with the second seating module 33. This allows a respective passenger seated in a seat associated with the second seating module 33 to place a portion of his or her hand, particularly the respective passenger's fingers, in the recess 3 so that the respective passenger can pull himself or herself up from the seat when the respective passenger is in a seated position or when the passenger is laying down with the seat in a converted bed position. The recess 3 has an opening that may face in a direction perpendicular to the traveling direction 35, toward the ceiling 4 of the vehicle 6. The recess 3 has a length L that is aligned with the traveling direction 35.

FIG. 2 is a top view of an arrangement of the seating module 1, the second seating module 33 and a seating module 35. The seating module 33 and the seating module 35 are identical to the seating module 1 and have the same features as the seating module 1. Each recess 3 associated with a respective one of the seating modules 1, 33, 35 defines a grip for two passengers located in a rear row of seats.

Figure 3:
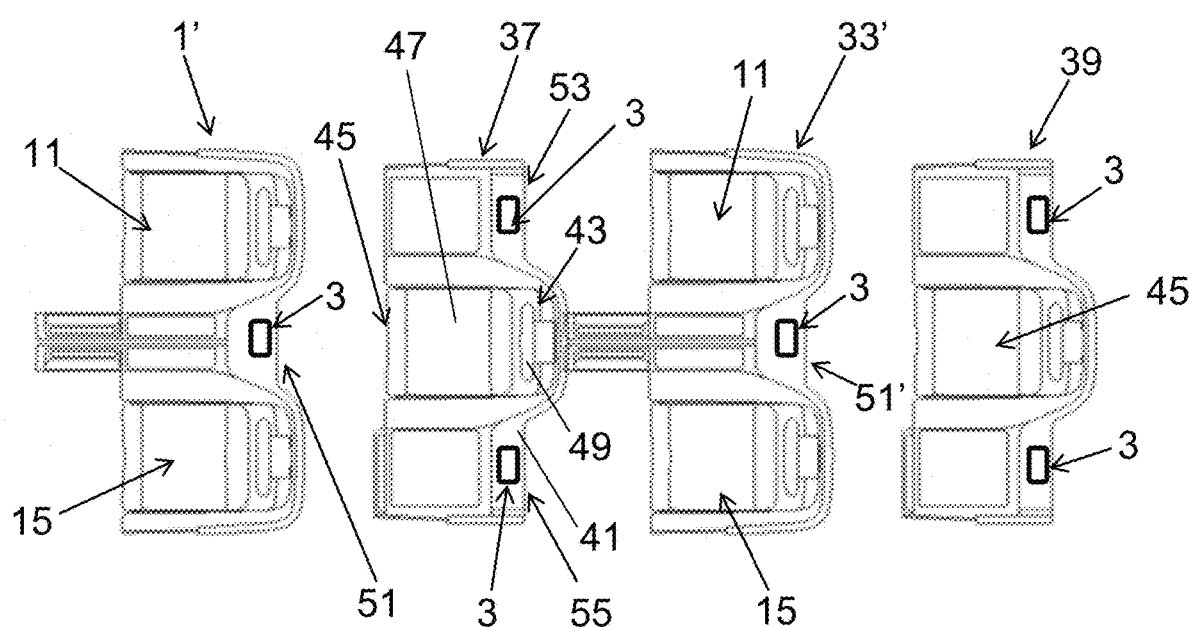
FIG. 3 is a top plan view of another embodiment of an arrangement of seat modules.

FIG. 3 is a view of another embodiment of an arrangement of seating modules. The seating module 1' is arranged in front of a seating module 37 with respect to the traveling direction 35 of the vehicle. The seating module 37 is arranged in front of the seating module 33' with respect to the traveling direction 35 of the vehicle. The seating module 33' is arranged in front of a seating module 39 with respect to the traveling direction 35 of the vehicle. The seating module 33' is identical to the seating module 1' and the seating module 37 is identical to the seating module 39. The seating module 1' is identical to the seating module 1, but further includes a footwell 51.

The seating module 37 has a shell 41. The shell 41 defines a seating area 43. A seat 45 is provided in the seating area 43. The seat 45 includes a backrest 49 for supporting at least a back portion of a passenger and a seat support structure (cushion) 47 for supporting the buttock and at least a leg portion of a passenger. The seat 45 may be converted to a bed. A footwell 53 is provided on one side of the seat 45 and another footwell 55 is provided on another side of the seat 45. The footwell 51 defines a space for receiving feet of a passenger located behind the seating module 1' in the seat 45 associated with the seating module 37. The recess 3 of the seating module 1' defines a grip for the passenger located in seat 45 associated with the seating module 37 so that the passenger may place his or her hand, particularly his or her fingers, in the recess 3 so that the passenger can lift himself or herself off up from the seat 45. The shell 41 has two recesses 3. One of the two recesses 3 in the shell 41 defines a grip for a passenger in the seat 11 associated with the seating module 33', which allows the passenger in the seat 11 to place his or her hand, particularly his or her fingers, in the recess 3 to lift himself or herself up from the seat 11. Another one of the two recesses 3 in the shell 41 defines a grip for a passenger in the seat 15 associated with the seating module 33', which allows the passenger in the seat 15 to place his or her hand, particularly his or her fingers, in the recess 3 to lift himself or herself up from the seat 15. The recess 3 of the seating module 33' defines a grip for a passenger in the seat 45 that is associated with the seating module 39, which allows a passenger in the seat 45 to place his or her hand, particularly his or her fingers, in the recess 3 of the seating module 33' to lift himself or herself up from the seat 45.

The footwell 53 has a space for receiving the feet of a passenger located in the seat 11 associated with the seating module 33'. The footwell 53 may also receive a portion of the seat 11 when the seat 11 is converted to a bed. The footwell 55 has a space for receiving the feet of a passenger located in seat 15 associated with the seating module 33'. The footwell 55 may also receive a portion of the seat 15 associated with the seating module 33' when the seat 15 is converted into a bed. The footwell 51' associated with the seating module 33' has a space for receiving the feet of a passenger located in the seat 45. The footwell 51' may also receive a portion of the seat 45 when the seat 45 is converted to a bed.

The arrangement of seating modules shown in FIG. 3 provides an offset arrangement of seats. The seat 45 associated with the seating module 37 and the seat 45 associated with the seating module 39 are arranged offset from the seat 11 and the seat 15 associated with the seating module 1' and the seat 11 and the seat 15 associated with the seating module 33' with respect to a lateral direction, which is perpendicular to the traveling direction 35 of the vehicle. The seat 11 associated with the seating module 1' is aligned with the seat 11 associated with the seating module 33' with respect to a longitudinal direction of the seating arrangement. The seat 15 associated with the seating module 1' is aligned with the seat 15 associated with the seating module 33' with respect to the longitudinal direction of the seating arrangement. The seat 45 associated with the seating module 37 is aligned with the seat 45 associated with the seating module 39. The recess 3 associated with a respective seating module may be arranged in front of a rearward seat and may be aligned with the rearward seat. In another embodiment, the recess 3 associated with a respective seating module may be offset in a longitudinal direction of the seating modules.

Figure 4:
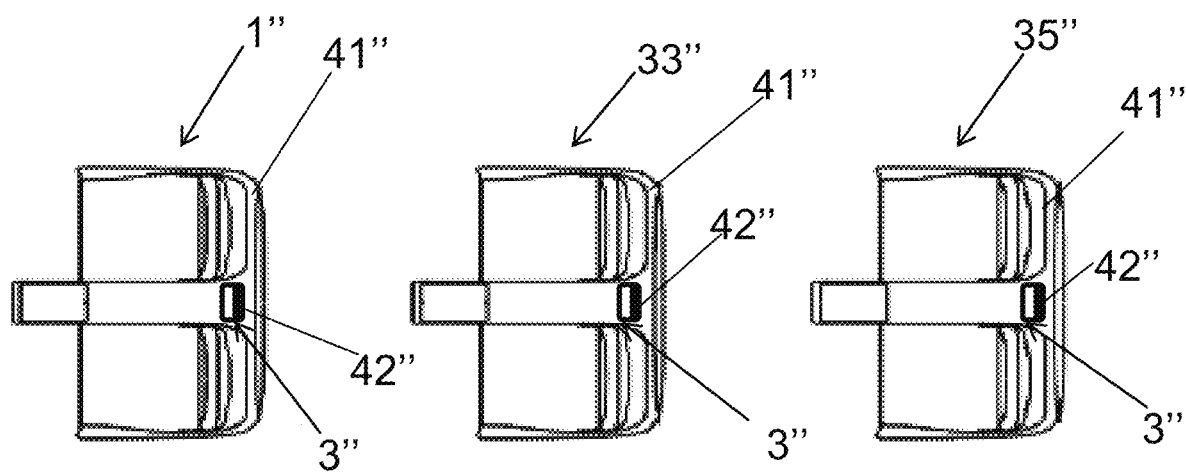
FIG. 4 is a top plan view of an arrangement of seating modules having a different embodiment of a recessed grip.

FIG. 4 is a top view of an arrangement of seating modules 1", 33" and 35". Each of the seating modules 1", 33" and 35" has a shell 41" and a recess 3" provided in the shell 41". A portion 42" of the shell 41" may overhang the recess 3" such that the portion 42" of the shell 41" defines a grip. A user may grasp the portion 42" of the shell 41" such that the user's fingers are arranged in the recess 3" and the user's fingers engage underneath the portion 42" of the shell 41". Each recess 3" associated with a respective one of the seating modules 1", 33", 35" defines a grip for two passengers located in a rear row of seats.

Figure 5:
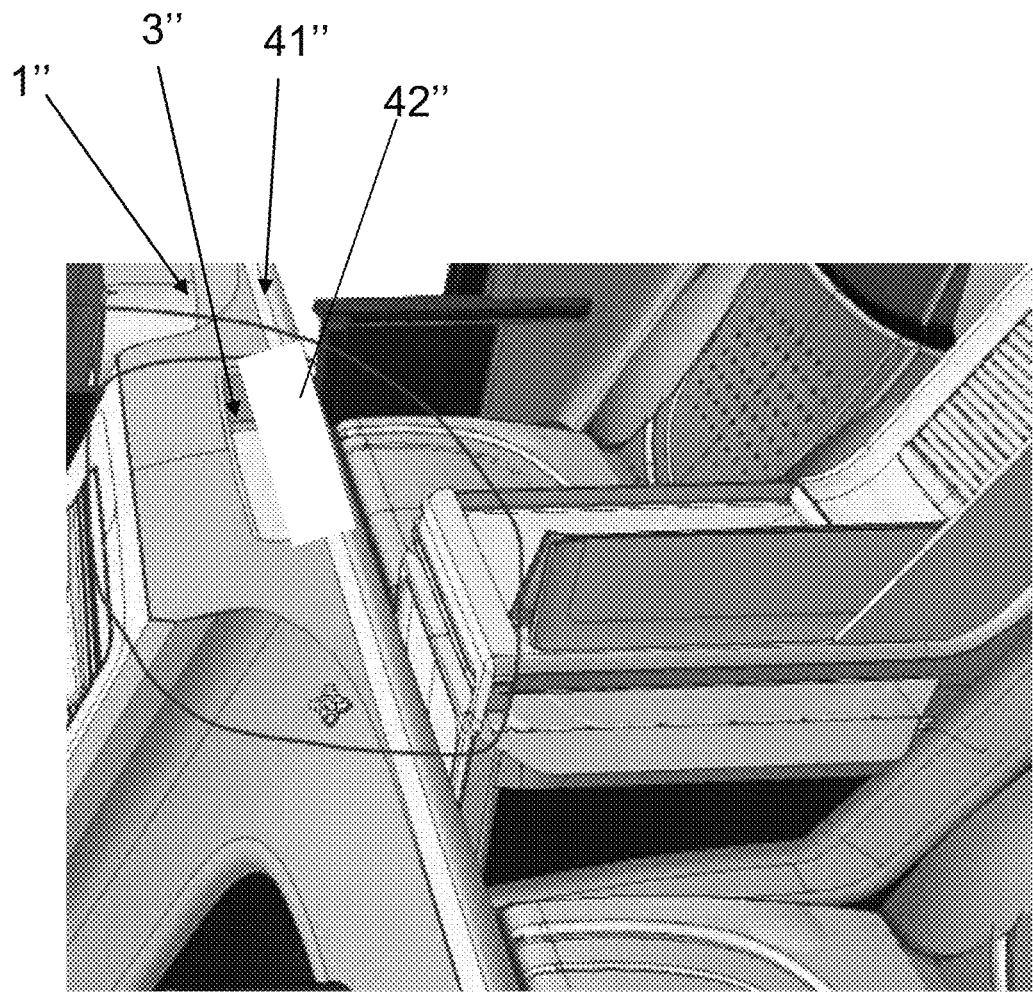
FIG. 5 is an enlarged partial perspective view of one of the seating modules provided in the arrangement of seating modules of FIG. 4.

FIG. 5 is an enlarged perspective view of the seating module 1" in the area of the recess 3". The portion 42" of the shell 41" projects over the recess 3" such that the portions 42" defines a grip (grip structure) for the user to grasp as the user is entering or exiting a seat located rearward of the shell 41".

Figure 6:
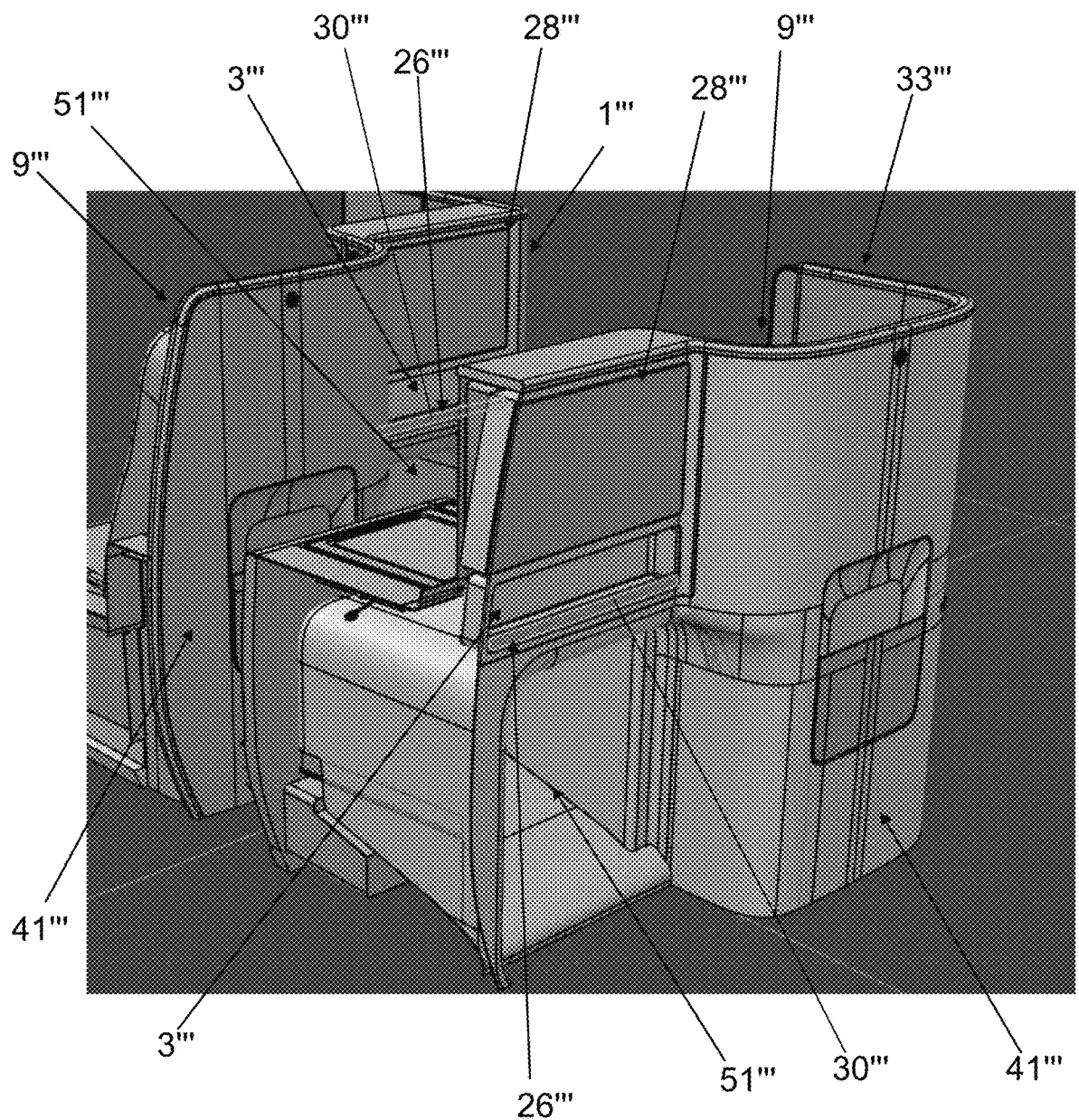
FIG. 6 is a rear perspective view of an arrangement of seating modules.

FIG. 6 is a rear perspective of a plurality of seating modules 1''' and 33'''. Each of the seating modules 1''' and 33''' has a recess 3''', a footwell 51''', a grip structure 26''', a shell 41''' defining a seating area 9''' and an area for mounting a display 28''' mounted to a rear surface of a respective seating module. The grip structure 26''' defines a handle 30''', which a passenger can grasp in order to get into or out of a seat. The grip structure 26''' is shown on a shell defining a single seating area, but it is understood that such a grip structure 26''' may be provided on a shell associated with the seating modules 1, 1', 1", 33, 33', 33", 35, 35", 37 and 39 without any other recess or in combination with the recess provided in the upper surface of a respective shell.

While specific embodiments of the invention have been shown and described in detail to illustrate the application of the principles of the invention, it will be understood that the invention may be embodied otherwise without departing from such principles.

What is claimed is:

1. A seating module comprising:
a seating module structure comprising a seat and a shell structure defining a seating area in which the seat is provided, wherein the shell structure is located at least behind the seat with respect to a direction of travel of a vehicle, wherein the shell structure comprises at least one recess, said at least one recess defining a grip for a passenger located behind the seating module with respect to a direction of travel of the vehicle, wherein said at least one recess faces in a direction of a ceiling of the vehicle, said shell structure defining a partition between said seating module and another seating module.

2. A seating module in accordance with claim 1, wherein said shell structure comprises a shell structure upper surface, said shell structure upper surface defining said at least one recess.

3. A seating module in accordance with claim 2, wherein said shell structure defines a first seating area and a second seating area.

4. A seating module in accordance with claim 3, wherein said at least one recess is located between said first seating area and said second seating area.

5. A seating module in accordance with claim 1, wherein said shell structure comprises another recess.

6. A seating module in accordance with claim 5, wherein said shell structure defines a single seating area, said at least one recess being located on one side of said single seating area and said another recess being located on another side of said single seating area with respect to a lateral direction, said lateral direction being perpendicular to the traveling direction of the vehicle.

7. A seating module in accordance with claim 6, wherein said at least one recess is aligned with said another recess in said lateral direction.

8. A seating module in accordance with claim 1, wherein the vehicle is an aircraft, wherein the recess remains in a fixed position independent of movement of the seat.

9. A seating arrangement for a vehicle, the seating arrangement comprising:
a seating module comprising a seating module structure, said seating module structure comprising a seat and a shell structure defining a seating area in which the seat is provided, the shell structure being located at least behind said seat with respect to a direction of travel of a vehicle, said shell structure comprising at least one recess, said at least one recess defining a grip for a passenger located behind the seating module with respect to a direction of travel of said vehicle, said shell structure comprising another recess, wherein said seating area is the only seating area defined by the shell structure, said at least one recess being located on one side of said single seating area and said another recess being located on another side of said single seating area with respect to a lateral direction, said lateral direction being perpendicular to the traveling direction of the vehicle, said shell structure defining a partition between said seating module and another seating module.

10. A seating arrangement in accordance with claim 9, wherein said shell structure comprises a shell structure upper surface, said shell structure upper surface defining said at least one recess, wherein said at least one recess remains in a fixed position independent of movement of said seat.

11. A seating arrangement in accordance with claim 10, wherein said shell structure defines another seating area.

12. A seating arrangement in accordance with claim 11, wherein said at least one recess is located between said seating area and said another seating area.

13. A seating arrangement in accordance with claim 9, wherein said at least one recess is aligned with said another recess in said lateral direction.

14. A seating arrangement in accordance with claim 13, wherein said at least one recess faces in a direction of a ceiling of the vehicle, the vehicle being an aircraft.

15. A seating arrangement in accordance with claim 9, further comprising another seating module to provide a plurality of seating modules, each seating module being located at a spaced location from each other with respect to the direction of travel of the vehicle, wherein one of:
each of said seating modules comprises a shell structure, said shell structure defining said at least one recess; and
one of said seating modules comprises a first shell structure defining said at least one recess and another one of said seating modules comprises a second shell structure defining two recesses offset from said at least one recess in a lateral direction, said lateral direction being perpendicular to the direction of travel of the vehicle.

16. A seating arrangement for a vehicle, the seating arrangement comprising:
a seating module comprising a seating module structure, said seating module structure comprising a shell structure, said shell structure defining a seating area, said shell structure comprising at least one recess, said at least one recess defining a grip for a passenger located behind the seating module with respect to a direction of travel of a vehicle;

a seat arranged in said seating area, wherein the seat is movable relative to said shell structure, said shell structure being located at least behind said seat with respect to said direction of travel of said vehicle, wherein said shell structure forms no part of said seat another seating module to provide a plurality of seating modules, each seating module being located at a spaced location from each other with respect to the direction of travel of the vehicle, wherein one of:

each of said seating modules comprises a shell structure, said shell structure defining said at least one recess; and one of said seating modules comprises a first shell structure defining said at least one recess and another one of said seating modules comprises a second shell structure defining two recesses offset from said at least one recess in a lateral direction, said lateral direction being perpendicular to the direction of travel of the vehicle.

17. A seating arrangement for a vehicle, the seating arrangement comprising:

a seating module comprising a seating module structure, said seating module structure comprising a shell structure located at least behind said seat with respect to a direction of travel of a vehicle, said shell structure comprising at least one recess, said at least one recess defining a grip for a passenger located behind the seating module with respect to a direction of travel of said vehicle;

another seating module to provide a plurality of seating modules, each seating module being located at a spaced location from each other with respect to the direction of travel of the vehicle, wherein one of:

each of said seating modules comprises a shell structure, said shell structure defining said at least one recess; and one of said seating modules comprises a first shell structure defining said at least one recess and another one of said seating modules comprises a second shell structure defining two recesses offset from said at least one recess in a lateral direction, said lateral direction being perpendicular to the direction of travel of the vehicle.

18. A seating arrangement for a vehicle, the seating arrangement comprising:

a seating module comprising a seating module structure, said seating module structure comprising a shell structure, said shell structure defining a seating area, said shell structure comprising at least one recess, said at least one recess defining a grip for a passenger located behind the seating module with respect to a direction of travel of a vehicle;

a seat arranged in said seating area, wherein the seat is movable relative to said shell structure, said shell structure being located at least behind said seat with respect to said direction of travel of said vehicle;

another seating module to provide a plurality of seating modules, each seating module being located at a spaced location from each other with respect to the direction of travel of the vehicle, wherein one of:

each of said seating modules comprises a shell structure, said shell structure defining said at least one recess; and one of said seating modules comprises a first shell structure defining said at least one recess and another one of said seating modules comprises a second shell structure defining two recesses offset from said at least one recess in a lateral direction, said lateral direction being perpendicular to the direction of travel of the vehicle.

19. A seating arrangement for a vehicle, the seating arrangement comprising:

a seating module comprising a seating module structure, said seating module structure comprising a seat and a shell structure defining a seating area in which the seat is provided, the shell structure being located at least behind said seat with respect to a direction of travel of a vehicle, said shell structure comprising at least one recess, said at least one recess defining a grip for a passenger located behind the seating module with respect to a direction of travel of said vehicle, said shell structure comprising a shell structure upper surface, said shell structure upper surface defining said at least one recess, wherein said at least one recess remains in a fixed position independent of movement of said seat, said shell structure defining another seating area, at least one recess being located between said seating area and said another seating area.

20. A seating arrangement for a vehicle, the seating arrangement comprising:

a seating module comprising a seating module structure, said seating module structure comprising a seat and a shell structure defining a seating area in which the seat is provided, the shell structure being located at least behind said seat with respect to a direction of travel of a vehicle, said shell structure comprising at least one recess, said at least one recess defining a grip for a passenger located behind the seating module with respect to a direction of travel of said vehicle;

another seating module to provide a plurality of seating modules, each seating module being located at a spaced location from each other with respect to the direction of travel of the vehicle, wherein one of:

each of said seating modules comprises a shell structure, said shell structure defining said at least one recess; and one of said seating modules comprises a first shell structure defining said at least one recess and another one of said seating modules comprises a second shell structure defining two recesses offset from said at least one recess in a lateral direction, said lateral direction being perpendicular to the direction of travel of the vehicle.

* * * * *